No. 672,572. Patented Apr. 23, 1901.
R. E. SCHLEY.
TOOTH FOR SEEDERS, HARROWS, &c.
(Application filed Sept. 12, 1900.)
(No Model.)
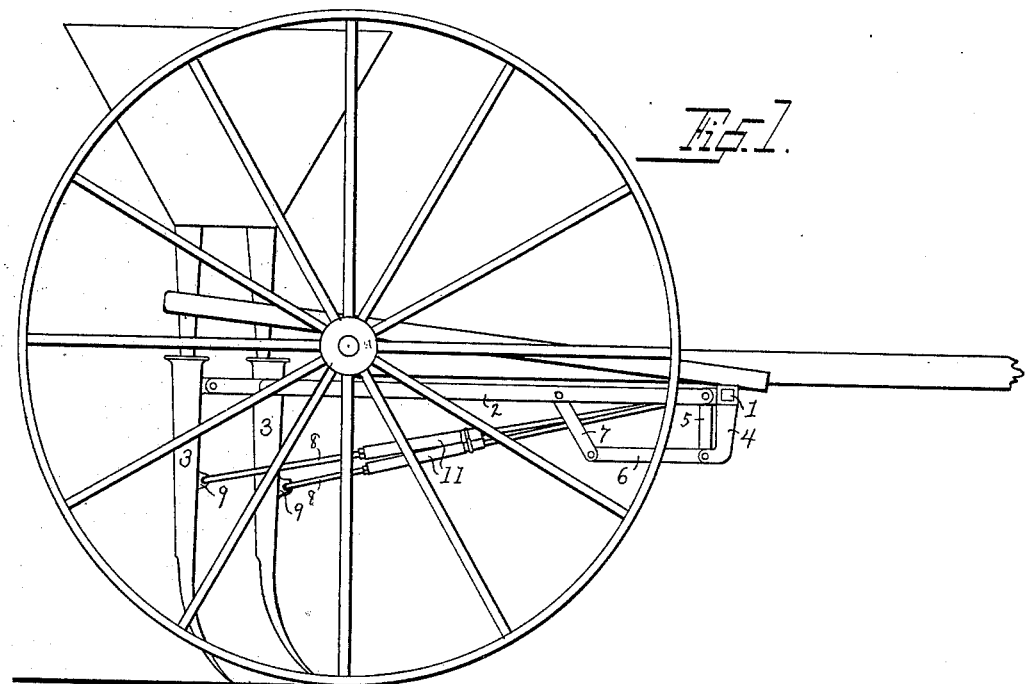
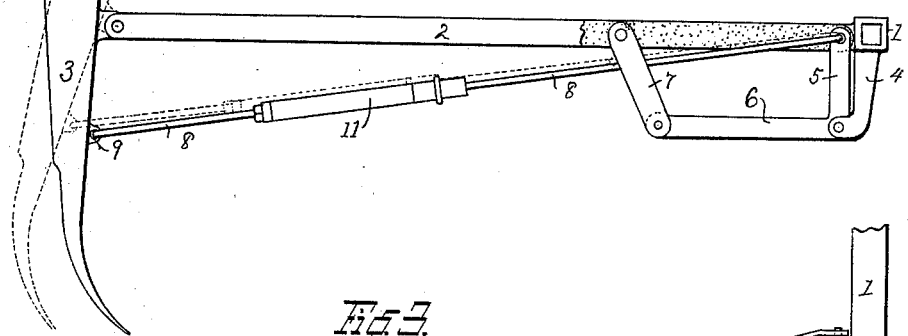
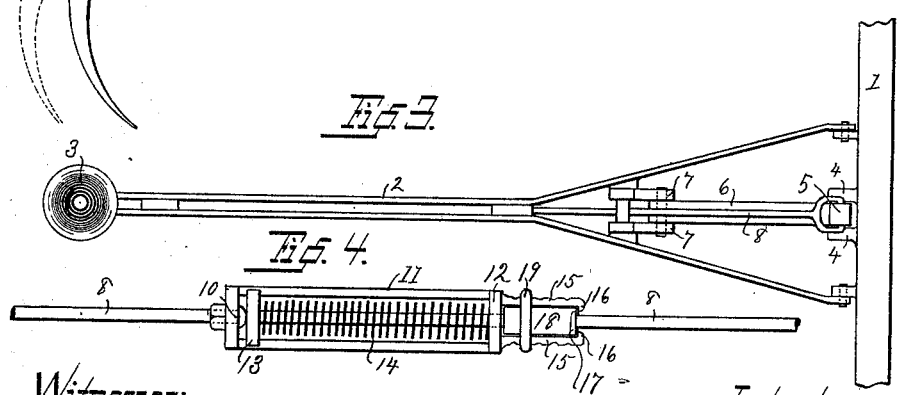
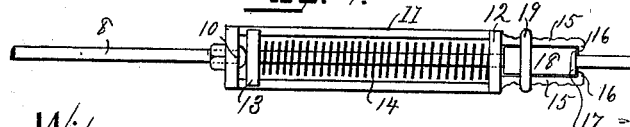
Witnesses:
Inventor
Rudolph Edward Schley
By Erwin & Wheeler,
Attorneys.

UNITED STATES PATENT OFFICE.

RUDOLPH EDWARD SCHLEY, OF JUNEAU, WISCONSIN.

TOOTH FOR SEEDERS, HARROWS, &c.

SPECIFICATION forming part of Letters Patent No. 672,572, dated April 23, 1901.

Application filed September 12, 1900. Serial No. 29,781. (No model.)

*To all whom it may concern:*

Be it known that I, RUDOLPH EDWARD SCHLEY, a citizen of the United States, residing at Juneau, county of Dodge, and State of Wisconsin, have invented new and useful Improvements in Teeth for Seeders, Harrows, &c., of which the following is a specification.

My invention relates to improvements in teeth for seeders, cultivators, or harrows, and pertains especially to the mechanism by means of which the tooth is supported and automatically adjusted with reference to the character of the soil.

The object of my invention is to provide a form of seeder, cultivator, or harrow in which the teeth will within certain definite limits be driven into the ground with a force proportional to the resistance of the soil, whereby in cultivating hard soils the teeth will be made to enter instead of merely scratching the surface.

My invention also contemplates the provision of means for releasing the tooth in case the resistance becomes so great as to endanger the structure.

In the accompanying drawings I have shown my invention applied to a seeder, in which case it is especially desirable that the teeth be driven into the ground to a substantially uniform depth in order that the seed may be properly and uniformly covered.

In the drawings, Figure 1 is a side elevation of a seeder, showing my invention applied thereto. Fig. 2 is a side view of one of the teeth and of its supporting connections. Fig. 3 is a top view of the same. Fig. 4 is a detail view, enlarged, showing a yielding spring-coupling used for the purpose of releasing the tooth in order to prevent breakage when a stone or root is encountered.

Like parts are identified by the same reference characters throughout the several views.

1 is the main cross-beam of a seeder, cultivator, or harrow. 2 is one of the drag-bars, pivotally secured to the beam 1 and to the shank 3 of the tooth, the latter being tubular in form for the purpose of guiding the seed into the furrow. These parts may be of any ordinary construction. It will be observed, however, that I have provided the beam 1 with depending brackets 4, to which elbow-levers are fulcrumed, with one arm 5 extending vertically to a plane substantially that of the drag-bars and the other arm 6 extending horizontally, or substantially so, as shown in Fig. 2. The outer end of the arm 6 is connected with the drag-bar 2 by a link 7, and the vertical arm 5 of the elbow-lever is connected with a stay-rod 8, the other end of which is pivotally secured to the tooth-shank at an intermediate point 9 between the point of the tooth and the point of attachment of the drag-bar.

It is obvious that with the above-described construction an increase in the resistance or pressure against the point of the tooth will cause a corresponding increase in the pull on the arm 5 of the elbow-lever, thus tending to swing the other arm downwardly, with a corresponding downward pull on the drag-bar through the medium of the link 7. With the parts in substantially the proportion shown the tooth will be maintained in a vertical position, for as the drag-bar 2 moves downwardly or upwardly the arm 5 of the elbow-lever will swing backwardly or forwardly and correspondingly extend or shorten the reach of the rod 8.

In order to release the tooth in case unusual resistance is encountered, such as a stone or root, which would otherwise break the tooth or its supporting connections, I have formed the stay-rod 8 in two sections connected together by an open link or slotted coupling 11. One section of the stay-rod is swiveled at 10 to one end of the coupling, and the other section of the rod 8 passes through the opposing end 12 of the link or coupling into screw-threaded engagement with a sliding nut or cross-head 13, and a compression-spring 14 is interposed between the end 12 of the coupling and the cross-head or nut 13. Elastic arms 15, projecting from the coupling, (preferably from the end 12 thereof,) are provided with hooks 16, which engage a shoulder 17 on that section of the stay-rod which is connected with the nut 13. This shoulder may be formed by rigidly securing a sleeve or thimble 18 to the rod or by providing the rod with an integrally-thickened portion or in any other convenient manner. An open ring 19, longitudinally adjustable upon the arms 15, is adapted to regulate the strength of the engagement of the hooks 16 with the shoulder 17. With this construction if a stone or root is encountered which fails to yield to the action of the tooth the arms 15 will spread and permit the disengagement of the hooks 16 from the shoulder 17, whereupon the tooth will be permitted to swing backwardly, as indicated by dotted lines in Fig. 2, when it will drag over the obstruction. As soon as the obstruction is cleared the spring 14 will restore the parts to their original position and the hooks 16 will reëngage the shoulder 17.

Having thus described my invention, what I claim as new, and desire to secure by Letters Patent, is—

1. The combination with the teeth of seeders, cultivators, &c.; of drag-bars having jointed connection with the teeth; elbow-levers pivotally secured to the machine-frame; connections between one arm of each elbow-lever and one of the teeth; and a link connecting the other arm of each lever with the drag-bar pertaining to such tooth.

2. The combination with the teeth of seeders, cultivators, &c.; of drag-bars having jointed connection with the teeth and the machine-frame respectively; elbow-levers fulcrumed to the machine-frame, each having one vertical and one horizontal arm; connections between the vertical arm of each lever, and one of the teeth; and a link connecting the horizontal arm of each lever with the drag-bar pertaining to such tooth.

3. The combination with the teeth of seeders, cultivators, &c.; of a drag-bar having jointed connection with each tooth, and with the machine-frame; stay-rods connected with each tooth; and lever connections for said rods, arranged to communicate a downward motion therefrom to the drag-bar.

4. The combination with the teeth of seeders, cultivators, &c.; of a drag-bar having jointed connections with each tooth, and with the machine-frame; a stay-rod connected with each tooth; levers fulcrumed on the frame and connected with the stay-rod and drag-bar of each tooth, said levers being arranged to communicate a downward movement to the drag-bar when subjected to a pull exerted by the stay-rod, whereby the tooth is permitted to move backwardly when subjected to unusual pressure.

5. The combination with the teeth of seeders, cultivators, &c., of a drag-bar having jointed connection with each tooth and with the machine-frame; elbow-levers fulcrumed on the machine-frame, each with one arm linked to the drag-bar of one of the teeth; and a stay-rod connecting the other arm of said lever with the corresponding tooth, said stay-rod being formed in sections, united by a spring-tension coupling, together with a releasing-clutch connected with said coupling and adapted to hold the same rigidly, except when subject to extraordinary tension.

6. The combination with the teeth of seeders, cultivators, &c.; of a drag-bar having jointed connection with each tooth and with the machine-frame; elbow-levers fulcrumed on the machine-frame, each with one arm linked to the drag-bar of one of the teeth; and a stay-rod connecting the other arm of said lever with the corresponding tooth, said stay-rod being formed in sections, united by a spring-tension coupling, together with a releasing-clutch connected with said coupling and adapted to hold the same rigidly, except when subject to extraordinary tension; and means for increasing and diminishing the holding power of said clutch.

In testimony whereof I affix my signature in the presence of two witnesses.

RUDOLPH EDWARD SCHLEY.

Witnesses:
BUTLER BABCOCK,
FRANK W. JILLSON.